United States Patent [19]

Church et al.

[11] Patent Number: 4,914,868
[45] Date of Patent: Apr. 10, 1990

[54] LAPPING CONTROL SYSTEM FOR MAGNETIC TRANSDUCERS

[75] Inventors: Mark A. Church, Los Gatos; Annayya P. Deshpande, San Jose; Alain M. Desouches, Santa Cruz; George S. Pal, Saratoga; Michael P. Salo, San Jose; Muhammad I. Ullah, Morgan Hill, all of

[73] Assignee: International Business Machines Corporation, Armonk, N.Y.

[21] Appl. No.: 250,685

[22] Filed: Sep. 28, 1988

[51] Int. Cl.[4] .............................................. B24B 49/00
[52] U.S. Cl. .............................. 51/165.71; 51/165.77; 29/603
[58] Field of Search ................ 51/165, 165.71, 165.74, 51/165.76, 165.77; 29/603

[56] References Cited

U.S. PATENT DOCUMENTS 3,702,042 11/1972 Cochran et al. ................... 51/165 R
4,457,114 7/1984 Hennenfent .
4,689,877 9/1987 Church ............................. 51/165 R

OTHER PUBLICATIONS

"Correction of Bowing of Magnetic Head Rows", M. A. Church, IBM Technical Disclosure Bulletin, vol. 24, No. 1A, Jun. 1981.

Primary Examiner—Robert Rose
Assistant Examiner—M. Rachuba
Attorney, Agent, or Firm—Otto Schmid, Jr.

[57] ABSTRACT

A lapping control system for a row of thin film magnetic transducers formed on a substrate. Each of the magnetic transducers comprises a magnetoresistive (MR) element, and the row is supported on a holder which has an elongated H-shaped slot near one edge to form a beam member upon which the row is mounted. The beam member is capable of being deflected in a substantially quadratic curvature when subjected to pressure from a pressure transducer at the middle of the beam member. The resistance of each of the MR elements is measured during lapping, and a control signal is generated to control the pressure transducers to control lapping with proper BALANCE and BOW and to terminate lapping when the desired MR element height is reached.

8 Claims, 6 Drawing Sheets

LAPPING CONTROL SYSTEM FOR MAGNETIC TRANSDUCERS

FIELD OF THE INVENTION

This invention relates to a method and apparatus to control the manufacture of magnetic transducers, and in particular to a lapping system for batch fabricating magnetic heads.

DESCRIPTION OF THE PRIOR ART

In high speed data processing systems, magnetic disks have been employed for large memory capacity requirements. Data is read from and written onto the disks from magnetic transducers commonly called magnetic heads which are positioned over the disk during the storage and retrieval of data on tracks of the disks. The requirements for higher data density on the magnetic disks have imposed a requirement to read and write more data on narrower tracks located on the disk. In order to achieve maximum efficiency from the transducer or head element, the element or pole pieces must have a pole tip height dimension, commonly called throat height, which must be maintained within a certain limited tolerance for generating a maximum amount of electrical signals from a given head.

The conventional method for producing a required throat height includes a lapping system in which an abrasive grinding surface accurately grinds the pole tips to a desired length. Suitable techniques for controlling the throat height during the lapping operation are described in commonly assigned U.S. Pat. No. 4,689,877. In this patent, a technique is employed for measuring the resistance of lapping guide structures formed on each side of a row of transducers being lapped to a final throat height. The lapping guide structure is lapped along one dimension to the same extent as the transducer pole tips. The resistance of the lapping guide structure at any given time indicates the amount of material that has been removed and hence the resistance is an indication of the final throat height of the transducers being lapped.

As the magnetic heads become progressively smaller, there is an increased chance that all the magnetic heads in a row will not be aligned with the lapping edge, a condition that is referred to as row bow. Row bow has been discussed in the IBM TECHNICAL DISCLOSURE BULLETIN, Vol. 24, No. 1A, June, 1981 at page 198. In this lapping system, electrical lapping guides are provided at each end and in the middle of the row of magnetic heads. The transfer tool, upon which the row of magnetic heads is mounted, is provided with a deflecting beam and corrective pressure is provided at each end of the transfer tool in addition to a two-way pressure at the middle of the row. Row bow is also considered in U.S. Pat. No. 4,457,114 in which the row has an electrical lapping guide between each of the magnetic heads in a row, and the workpiece which holds the row is formed with a fixed center portion and cantilevered end portions. The position of the end portions is bent to a position determined by associated resistive heating elements so that row bow can be compensated during the lapping process.

Known prior art solutions to the row bow problem require the use of additional electrical lapping guides require space in the row which otherwise could be used to produce more magnetic heads in the row.

SUMMARY OF THE INVENTION

It is therefore the principal object of this invention to provide a lapping control system for a thin film magnetic transducer comprising a magnetoresistive (MR) element in which the height of the MR element is controlled dynamically during lapping by monitoring the resistance of the MR elements.

In accordance with the invention, a lapping control system for accurately obtaining a desired element height of a batch fabricated thin film magnetic transducer utilizes a row of the film magnetic transducers formed on a substrate, each comprising an MR element having a height defining edge and at least two terminals. The row of thin film magnetic transducers is mounted in a position to lap the height defining edge of each of the MR elements, and means is provided for measuring the electrical resistance of the MR elements during lapping of the height defining edge. The measured resistances are used for controlling the degree of lapping for each of the MR elements in the row. The resistance is related to the MR element height, and, when the desired MR element height is reached, the lapping process is terminated.

It is a feature of the invention that the holder for a row of thin film magnetic transducers is provided with an elongated H-shaped slot to produce a beam, and the row of magnetic transducers is mounted on the beam. The holder is designed so that the beam deflects in a curvature which closely approximates a quadratic curvature.

It is another feature of the invention that a flat cable is provided which has spaced terminals to make contact with each of the MR elements in the row during lapping. spring loaded pressure bar provides the pressure needed to maintain electrical contact during lapping.

The foregoing and other objects, features and advantages of the invention will be apparent from the following more particular description of a preferred embodiment of the invention as illustrated in the accompanying drawings.

DESCRIPTION OF THE PREFERRED EMBODIMENT

The present invention is preferably for use in the fabrication of thin film head assemblies. The transducer portion of the thin film head is formed by depositing layers of magnetic material, electrically conductive material and electrically insulating material to form the well known pole pieces and magnetic gap necessary for the transducing function with a magnetic coating formed on a magnetic disk. A plurality of transducers are deposited onto a wafer which is then cut to form rows of the transducers with the transducers set in a side-by-side relationship. Each of the transducers comprises a magnetoresistive (MR) read head. As known in the art, a thin film inductive write head may also be produced on the same slider so that both read and write transducers are on the same slider. Electrical lapping guides are formed onto the wafer at the same time that the transducers are deposited. At least one electrical lapping guide (ELG) is deposited at each end of the row of transducers. The ELGs are used to control the rough lapping, and the MR read heads are sensed to control lapping to the final throat height of the transducers. The wafer is formed to become the slider of the magnetic head. The slider is mounted onto a suspension system which in turn is mounted onto an accessing system for locating the magnetic head onto tracks formed by the magnetic heads when writing onto the rotating disk. The lapping control system of the present invention, therefore, controls the lapping of a row of transducers in the batch fabrication process.

Figure 1:
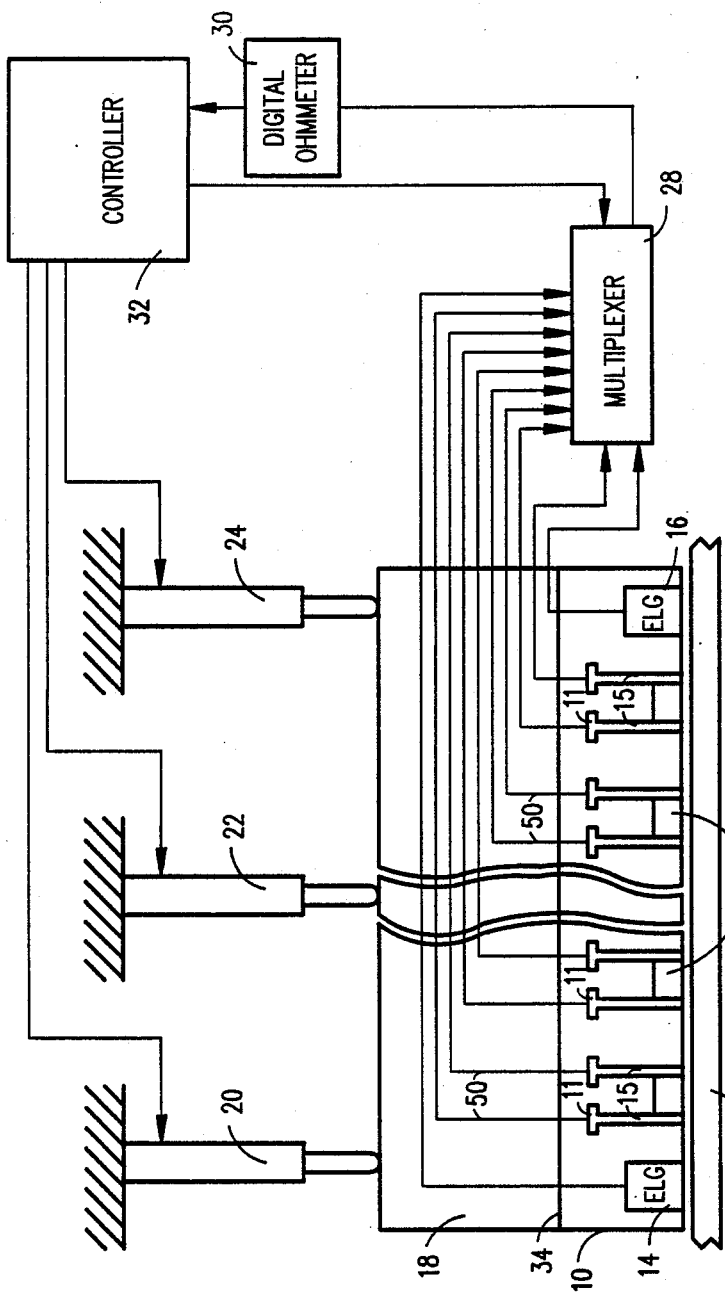
FIG. 1 is an overall system block diagram illustrating a lapping system that can be used to control row bow according to the present invention.

Referring to FIG. 1, there is shown an overall system block diagram of apparatus that controls the lapping of a substrate row 10 having a plurality of transducer elements 12 with ELGs 14 and 16 located at both ends of the row 10. Each of the transducer elements 12 comprises an inductive write head and a MR read head. As stated previously, this one row 10 of transducer 12 and ELGs 14 and 16 is but one section from the total wafer which includes a plurality of rows as well as a plurality of columns of transducer elements. The substrate row 10 is fastened to a holder 18 and placed against three actuators 20, 22, and 24 which position the substrate into a spaced relationship with a lapping plate 26. The actuators urge the substrate row 10 against the lapping plate 26 and control the amount of pressure placed against the holder 18. The lapping plate 26 is, as is known to those skilled in the art, an abrasive surface which through relative motion affects lapping of the substrate row 10. The substrate row is lapped in order to remove material such that the throat of the transducers 12 can be precisely located as will be described in detail below.

The depth of the lapping provided by the lapping plate 26 is monitored initially through the two ELGs 14 and 16. The ELGs 14 and 16 are deposited on the substrate at the same time as various layers of the transducer elements 12, and provide a means for electrically determining the throat height for the transducer elements. The ELGs 14 and 16 are connected to a multiplexer 28. The multiplexer 28 senses the electrical resistance of the separate ELGs and directs this information to a meter 30, which can be a standard ohmmeter measuring electrical resistance, and also sends the information to a controller 32. The controller 32 in turn controls the three actuators 20, 22 and 24 such that the substrate row can be kept level by varying the pressure applied by each actuator. A desired rough lapping dimension can be achieved under control of the ELGs 14 and 16.

The most critical dimension for lapping transducer elements 12 is the height of the MR read transducer, so it is a feature of the present invention that the MR read elements are sensed directly during lapping, so that the height of the MR element can be determined dynamically on line for each of the transducers in a row.

By measuring the resistance of each of the MR elements during lapping, it is possible to control the amount of pressure each section of the substrate row receives, and thus permit the actuators 20, 22 and 24 to maintain the substrate row 10 level with the lapping surface. The amount of pressure and the time the pressure is applied by each of the actuators 20, 22 and 24 determines the amount of material removed on the row. By controlling particular actuators, either a convex or a concave bow condition can be corrected by the use of a differential lapping technique. The differential in pressure produced by actuators 20, 22 and 24 causes the lapping of a different amount of material on a row. Mounting the row on a flexible beam permits the beam to deflect along the shape of a particular deflection curve as material is removed as will be discussed in greater detail below.

By comparing the relative resistance measurements from each MR element, the MR element height of each of the plurality of transducers along the row can be maintained at the same height during lapping. The resistance measurements provided by the MR elements are determined from the multiplexer 28 and the meter 30. Under control of controller 32, each of the resistance measurements provided by the MR elements can be addressed through the multiplexer 28 and the meter 30. The results of the measurement are stored in the controller 32 and are utilized as an indication of the MR element height achieved for the transducer elements 12 during the lapping process. The controller 32 can, by constantly measuring the resistance of each of the MR elements, maintain the substrate row level with respect to the lapping plate so that all MR elements are lapped to the same height. Additionally, when a certain MR element height is detected as having been achieved through the lapping process, the controller 32 may command the actuators 20, 22 and 24 to withdraw the substrate row 10 from the lapping surface to terminate the lapping process.

In general, the resistance of each of the MR elements is sensed by the controller 32, and the controller reacts to any difference in resistance, for instance, between MR elements in different parts of the row by applying added pressure to the part of the substrate row where the MR elements have lower resistance so that additional material can be removed in that part of the row to cause the resistance measured to increase for the MR elements at that part of the row.

Figures 2, 3:
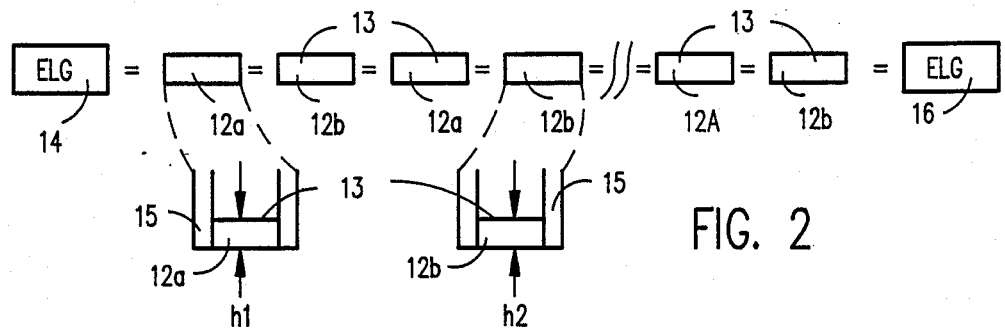
FIG. 2 is a diagram showing the location of the electrical lapping guides and the magnetic heads in a row according to an embodiment of the present invention.
FIG. 3 is a plan view of a specific embodiment of a holder which is useful with the present invention.

Referring to FIG. 2, the arrangement of the electrical lapping guides and the MR elements for a specific embodiment of the present invention are shown. The ELGs 14 and 16 are positioned at the ends of the row and the MR elements are positioned in a side-by-side relationship along the row between the ELGs 14 and 16. The MR elements are produced in two configurations 12a and 12b which are alternated along the row. As shown in the enlarged view, MR elements 12a are deposited with a first height h, measured from the upper edges 13 of the MR elements 12a and 12b, and MR elements 12b are deposited with a greater height $h_2$. The upper edges 13 of all the MR elements 12a and 12b are aligned, and the two MR elements 12a and 12b can be calibrated by considering the known height of each MR element and the measured resistance. The measured resistance also includes the resistance of the leads 15, and the lead resistance can also be determined.

The ohmic resistance through the MR element can be defined by $$R_{TOTAL} = R_{LEADS} + R_{ELEMENT} \quad (1)$$

where $R_{TOTAL}$ is the total resistance, $R_{LEADS}$ is the resistance contribution of the current transporting leads, and $R_{ELEMENT}$ is the resistance contribution of the $MR_{ELEMENT}$.

Equation (1) can be defined further by focusing on the MR element contribution, as follows:

$$R_{TOTAL} = R_{LEADS} + \frac{\rho l}{ht}, \quad (2)$$

where $\rho$ is the resistivity of the MR metallurgy, and 1, h, and t are the length, height and thickness of the MR element, respectively.

The parameters $\rho$, 1 and t can be combined in a constant k, and we have $$R_{TOTAL} = R_{LEADS} + \frac{k}{h} \quad (3)$$

from which we obtain $$h = \frac{k}{R_{TOTAL} - R_{LEADS}} \quad (4)$$

In order to accurately determine the final MR element height (at the conclusion of lapping), both K and $R_{LEADS}$ must be known. It is not possible by the use of equation (4) alone to determine both of these parameters directly. If, however, the lapping process begins with two well defined initial MR element heights, $h_1$ and $h_2$, interleaved throughout the row, then it becomes a simple matter to establish two equations in two unknowns for any two adjacent elements configured with alternating initial element heights, i.e., $$h_1 = \frac{k}{R_{TOTAL1} - R_{LEADS}} \quad (4a)$$

and $$h_2 = \frac{k}{R_{TOTAL2} - R_{LEADS}}, \quad (4b)$$

from which k and $R_{LEADS}$ can be determined directly and discretely.

This arrangement of MR elements permits the MR elements to be used to control the lapping process by providing MR elements with two known heights so that two separate calibrations can be made and related to the final resistance of each of the MR elements.

The holder 18 shown in FIG. 3 is designed so that control of the MR element height of all the elements in a row can be achieved by means of a one-way pressure during the lapping operation. The holder 18 comprises a lower surface 34 upon which a substrate row 10 of transducers is bonded prior to beginning the lapping operation. The holder is provided with an elongated "H" shaped slot 36 to produce a deflecting beam member 38. The shape of the slot 36 as defined by dimensions A, B, C and D is critical in obtaining a tight throat MR element height control. These dimensions define the stiffness and maximum deflection of the beam 38 along with the shape of the deflection curve. By proper choice of slot dimensions A, B, C, and D, which can be calculated, the deflecting beam member 38 can be made to produce, with a concentrated load at the center, a deflection curvature closely approximating a second degree polynomial. The concentrated load at the center is produced by a captured push rod 40 which is engaged by actuator 22 on one end, and transmits the associated pressure to the center of deflecting beam member 38. The holder 18 is maintained in precise position during lapping by means of locating holes 42.

As previously discussed, the mounting of a row 10 of transducers on a bending beam, such as beam member 38 of holder 18, differential lapping can be performed. By this technique, the provision of different pressures causes different amounts of material to be lapped. For example, when the central pressure is lower (or off) than the end pressures, the throat height of the transducers in the middle transducers will be proportionately larger. Should the pressure at the ends be greater, then the throat height of the transducers at the end of the row would be greater.

Figure 5:
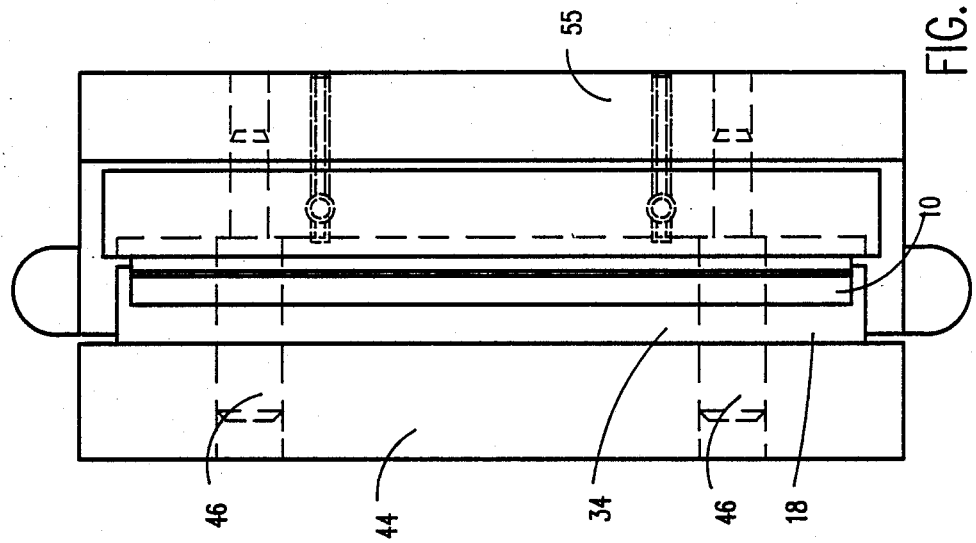
FIG. 5 is a top view of a specific embodiment of the magazine assembly, which holds the transfer tool in position during the lapping operation.
Figure 4:
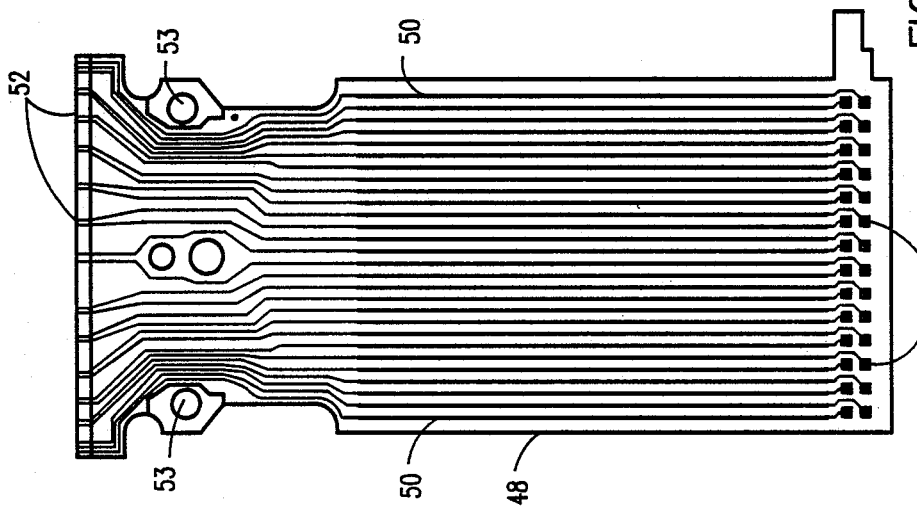
FIG. 4 is a plan view of a specific embodiment of the sensor cable of the present invention.
Figure 6:
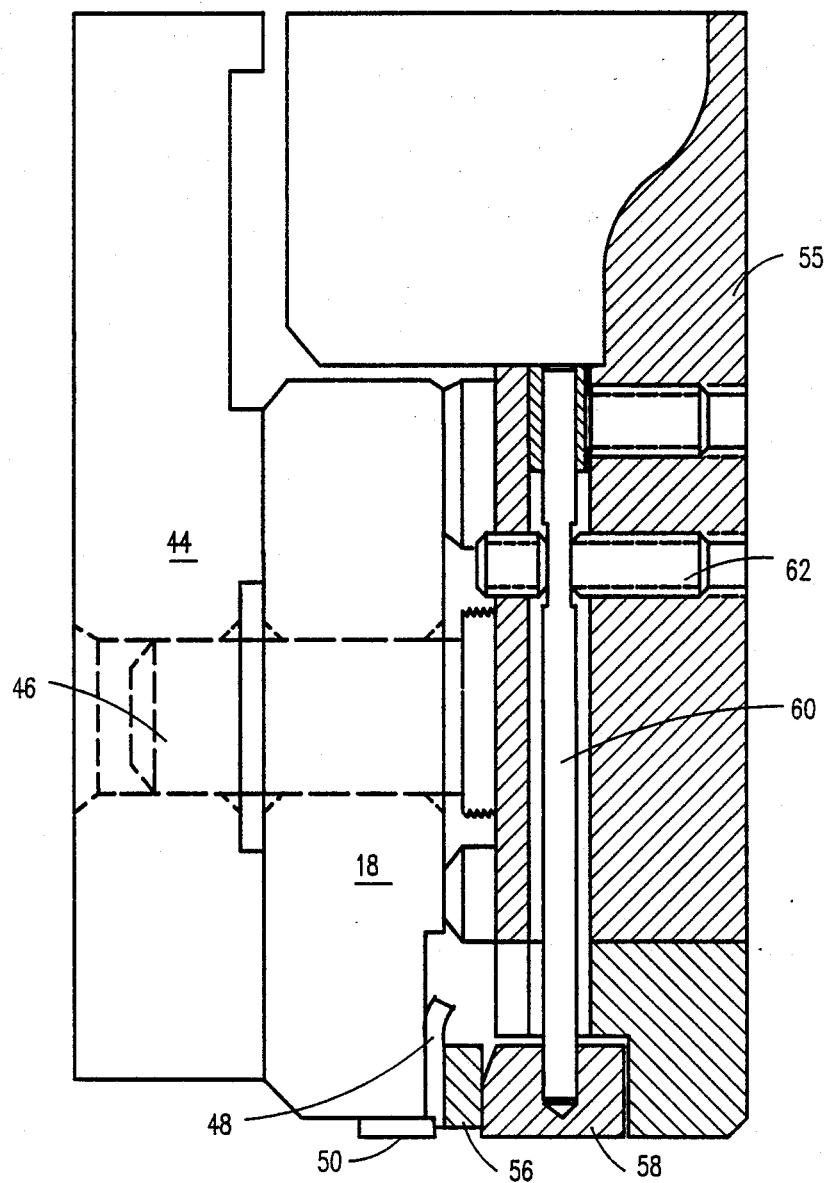
FIG. 6 is a section view along lines 6—6 of FIG. 5.

The holder 18 is held in place during lapping by means of the magazine assembly shown in FIGS. 5 and 6. The magazine assembly comprises a back plate 44 that includes a pair of locating pins 46 which are precisely positioned. The holder 18 is precisely positioned next to back plate 44 by locating holes 42 and locating pairs 46. Electrical contact is made to each of the transducers on the row 10 bonded to holder 18 by means of a flat cable 48 (FIG. 4). Flat cable 48 comprises an insulating backing and a plurality of conductors 50 each having a terminal 52 at one end to provide electrical contact with a contact 11 on the row 10 and a contact 54 at the other end to provide a conductive path to multiplexer 28. Flat cable 48 is precisely positioned relative to holder 18 by means of locating holes 53 into which locating pins 46 are inserted.

Figure 7:
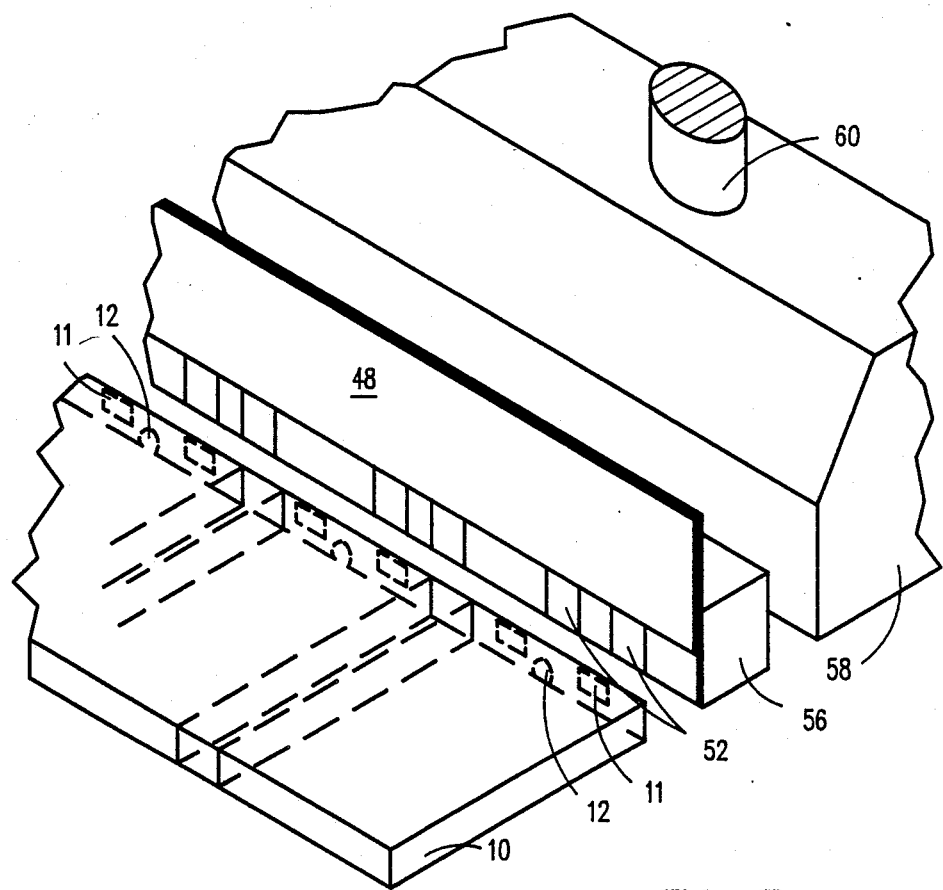
FIG. 7 is an exploded perspective view, with some parts cut away, showing the means for providing electrical contact to the magnetic heads in a row during lapping.

A magazine body member 55 is fixed in position with a predetermined force by suitable clamping means (not shown) to keep holder 18 in a fixed position during lapping. The magnitude of the force required to keep holder 18 in a fixed position is greater than the force required to produce electrical contact between terminals 52 and contacts 11, and in fact this force is sufficient to cause extrusion damage to flat cable 48. To adjust the contact pressure on flat cable 48 to a predetermined safe value, a resilient pad 56 (FIGS. 6 and 7) is pressed into contact with flat cable 48 by means of a pressure bar 58. Pressure bar 58 is attached to body member 55 by means of spring members 60. If desired, spring members 60 can be mounted so that the pressure can be adjusted by means of load adjust screw 62, for example.

Figure 8:
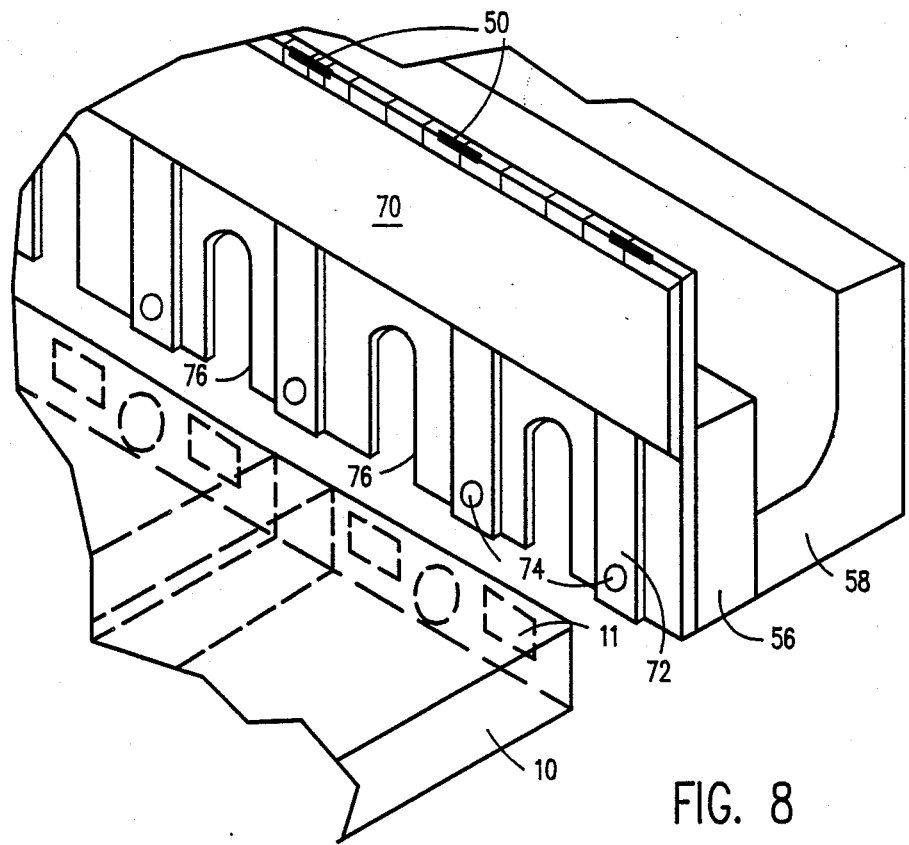
FIG. 8 is an exploded perspective view, with some parts cut away, showing an alternate embodiment of means for providing electrical contact to the magnetic heads in a row during lapping.
Figure 9:
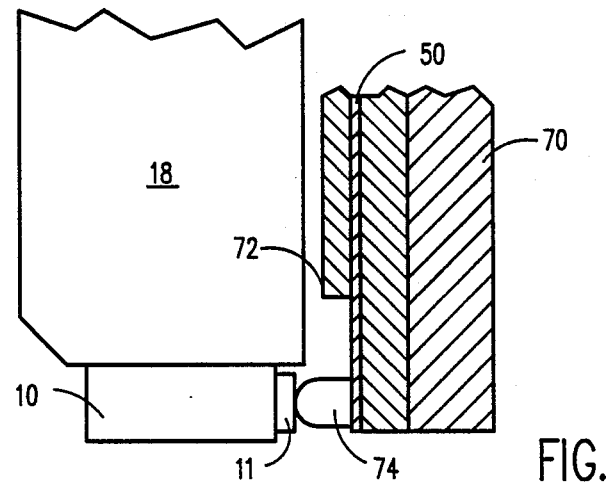
FIG. 9 is an enlarged view of the means for providing electrical contact to the magnetic heads in a row during lapping for the embodiment shown in FIG. 8.

The embodiment of the means for providing electrical contact to the magnetic heads in a row during lapping shown in FIGS. 8 and 9 comprises a modified flat cable 70 which has a terminal 72 at one end of each of the conductors 50' and terminals (not shown) at the other end of conductors 50 for connection to multiplexer 26. Each of the terminals 72 comprises a dome shaped contact element 74 which is positioned to contact a pad 11 on slider row 10. Dome shaped contact element can be produced by a gold plated solder ball, for example, which is reflow soldered in a hole formed in the end of conductors 50'. Slits 76 are also provided in the end portions of cable 70 to provide some flexibility and enable independent and compliant contacts to each of the head contact pads 11.

The operation of the lapping control system will now be described. After the transducer elements are deposited together with the ELGs onto a wafer, the wafer is cut such that the substrate row 10 is formed with an ELG at each end of the row of transducer elements 12 as shown in FIG. 1. The substrate row 10 is fastened to the holder 18, holder 18 is clamped into the magazine assembly, and then placed in a lapping system such that the substrate row 10 is placed adjacent to the lapping plate 26 to lap away material on one surface of substrate row 10. The lapping is initially controlled by the electrical lapping guides 14 and 16 to produce a rough lapping operation.

The lapping then continues by sensing the resistance of the MR elements under control of controller 30 and calculating the pressure that should be exerted by actuators 20, 22 and 24 to produce equal stripe heights in all MR elements and therefore produce dynamic bow compensation. This is accomplished by making local determinations of sheet resistance and lead resistance so that an accurate calculation of the MR element height can be made.

Electrical noise can be a problem in the lapping environment, so it is necessary to ensure that noise signals do not adversely affect the measured control factors. In addition, it is necessary to ensure that one "maverick" element does not produce too great an effect on the measured values. This is accomplished by performing, once the calculations for resistance have been made, a test to determine the best quadratic fit, and a FIT TEST is then performed to disqualify from the fitting any "maverick" element whose resistance may vary abnormally compared to the rest of the elements. This prevents such elements from adversely influencing the pressure corrections. The FIT TEST requires at least four elements, and consists of applying a bracket test to determine the difference between any element and its fitted value. Should this value exceed a predetermined value, the element is disqualified from the FIT calculation.

All elements accepted for the quadratic FIT test are also linearly fitted for BALANCE determination. BALANCE is the difference between the fitted left element and the fitted right element.

BALANCE=(SHL-SHR)

where SHL and SHR are are the linearly fitted end element heights of all elements that have passed the quadratic FIT TEST. The BALANCE factor can be represented by a 2-bit field as we steer within a control band of $\pm\Delta H$ as shown in Table I, for example.

TABLE I

| BALANCE | | Meaning | Necessary Action |
|---|---|---|---|
| Left | Right | | |
| 0 | 0 | Initial set | Balanced pressures |
| 0 | 1 | Set whenever BAL < $-\Delta H$ | Decrease left pressure |
| 1 | 0 | Set whenever BAL > $+\Delta H$ | Decrease right pressure |
| 0 | 0 | Set whenever BAL changes sign | Balanced pressures |

Another factor that is calculated in controller 32 is BOW. BOW is defined by $$BOW = \frac{SHL + SHR}{2} - SH_{MIDDLE}$$

where $SH_{MIDDLE}$ is the middle element of all elements that have passed the quadratic FIT TEST. The BOW factor can be defined by a 2-bit field as we steer within a control bank of $\pm\Delta B$ as shown in Table II.

TABLE II

| BOW | | Meaning | Necessary Action |
|---|---|---|---|
| + | − | | |
| 0 | 0 | Initial set | Balanced pressures |
| 0 | 1 | Set whenever BOW < $-\Delta B$ | Increase center pressure |
| 1 | 0 | Set whenever BOW > $+\Delta B$ | Decrease center pressure |
| 0 | 0 | Set whenever BOW changes sign | Balanced pressures |

There are three phases in the lapping process, and each phase must be completed before moving on to the next phase. The first phase is the ELG phase in which ELG resistances are used to pressure balance the row until the MR element is cut through. As is known in the art, a plurality of different ELGs can be used, each at a different height relative to the nominal MR element height. Once two MR elements are cut through, subsequent pressure balance is controlled using the resistance values measured for the MR elements.

The next phase is the slurry phase in which a slurry is used until the MR element heights reach a predetermined mean element height. A preset number of elements must be considered for this test, and when the threshold is reached, lapping pressure is removed but the clamping pressure is maintained.

The final phase is the polishing phase, and this phase is done with no slurry. This phase removes the last few microns of material, and, once the MR element height is reached, the lapping pressure and clamping pressure are removed.

Control of the lapping process can be controlled by a look-up table stored in controller 32, for example. A sample look-up table is shown in Table III.

TABLE III

| CONTROL FIELD LAPPING PRESSURES: P0/P1/P2/P3 = 0/3/4/5 Pds | | | | | | | | | | | |
|---|---|---|---|---|---|---|---|---|---|---|---|
| BALANCE | | BOW | | ELG Phase | | | Slurry Phase | | | Polish Phase | | |
| Lft | Rgt | + | − | Lft | Ctr | Rgt | Lft | Ctr | Rgt | Lft | Ctr | Rgt |
| 0 | 0 | 0 | 0 | 2 | 3 | 2 | 3 | 3 | 3 | 2 | 2 | 2 |
| 0 | 0 | 0 | 0 | 2 | 3 | 2 | 0 | 3 | 0 | 0 | 3 | 0 |
| 0 | 0 | 1 | 0 | 2 | 3 | 2 | 3 | 0 | 3 | 2 | 0 | 2 |
| 0 | 1 | 0 | 0 | 1 | 3 | 2 | 1 | 3 | 2 | 1 | 2 | 2 |
| 0 | 1 | 0 | 1 | 1 | 3 | 2 | 0 | 3 | 1 | 0 | 3 | 1 |
| 0 | 1 | 1 | 0 | 1 | 3 | 2 | 1 | 0 | 3 | 1 | 0 | 2 |
| 1 | 0 | 0 | 0 | 2 | 3 | 1 | 2 | 3 | 1 | 2 | 2 | 1 |
| 1 | 0 | 0 | 1 | 2 | 3 | 1 | 1 | 3 | 0 | 1 | 3 | 0 |

TABLE III-continued

| CONTROL FIELD LAPPING PRESSURES: P0/P1/P2/P3 = 0/3/4/5 Pds |||||||||||||
|---|---|---|---|---|---|---|---|---|---|---|---|
| BALANCE || BOW || ELG Phase ||| Slurry Phase ||| Polish Phase |||
| Lft | Rgt | + | − | Lft | Ctr | Rgt | Lft | Ctr | Rgt | Lft | Ctr | Rgt |
| 1 | 0 | 1 | 0 | 2 | 3 | 1 | 3 | 0 | 1 | 2 | 0 | 1 |

All the control bits are set to zero at the beginning of a lapping operation. Three different levels of pressure for actuators 20, 22 and 24 are provided in the example, but it is obvious that other levels of control pressures can be used. The Lft actuator is actuator 20, the Ctr actuator is actuator 22, and the Rgt actuator is actuator 24. For the calculated combination of BALANCE and BOW, Table III is accessed to provide the appropriate level of pressure for each of the actuators 20, 22 and 24. In this manner, a row is lapped in such a manner that all possible MR elements are within the chosen MR element height.

While the invention has been particularly shown and described with reference to a preferred embodiment thereof, it will be understood by those skilled in the art that various other changes in the form and details may be made therein without department from the spirit and scope of the invention.

We claim:

1. A lapping control system for accurately obtaining a desired element height of each of a plurality of batch fabricated thin film magnetic transducers comprising:
   a row of thin film magnetic transducers formed on a substrate each comprising a magnetoresistive element having a height defining edge and at least two terminals;
   means for mounting said row of thin film magnetic transducers in a position to lap said height defining edge of each of said magnetoresistive elements;
   means for measuring the resistance of said magnetoresistive elements during lapping of said height defining edge;
   means responsive to said measured resistance of said magnetoresistive elements to calibrate resistance versus height characteristics of said magnetoresistive elements during lapping of said height defining edge;
   means responsive to said calibrated resistance versus height characteristics for controlling the degree of lapping for each of said magnetoresistive elements in said row; and
   means for terminating said lapping process when a predetermined element height is reached for each of said magnetoresistive elements.

2. The lapping control system of claim 1 wherein said means for mounting said row of thin film magnetic transducers comprises:
   a holder having an elongated H-shaped slot to form a beam member;
   means for mounting said row of thin film magnetic transducers on said beam member.

3. The lapping control system of claim 1 wherein said means for measuring the resistance of said magnetoresistive elements during lapping comprises:
   a flat cable having a plurality of spaced conductors, each of said conductors having a terminal at one end, said terminals of said flat cable being spaced to contact the terminals of said magnetoresistive elements; and
   means for producing a predetermined pressure to produce electrical contact between said terminals of said flat cable and said terminals of said magnetoresistive element.

4. The lapping control system of claim 3 wherein said means for producing a predetermined pressure comprises a spring loaded pressure bar.

5. The lapping control system of claim 1 wherein said row of thin film magnetic transducers are formed with magnetoresistive elements alternating between a first height and a second height, said first height and said second height being measured from the edge of said magnetoresistive element opposite said height defining edge.

6. A lapping control system for accurately obtaining a desired element height of a batch fabricated magnetic transducer comprising:
   a row of the film magnetic transducers formed on a substrate, each comprising a magnetoresistive element having a height defining edge and two terminals;
   holding means comprising an elongated member having an H-shaped slot near one edge to form a beam member capable of being deflected in a substantially quadratic curvature;
   means for mounting said row on said beam member in a position to lap said height defining edge of each of said magnetoresistive elements;
   a plurality of pressure transducers, at least one of said pressure transducers being positioned to apply pressure to the beam member of said holding means;
   means for measuring the resistance of said magnetoresistive elements on said row as said row is being lapped;
   means responsive to the measured resistance values of said magnetoresistive elements to generate signals to control said pressure transducers for controlling lapping of the magnetoresistive elements; and
   means for terminating lapping when a predetermined element height is reached for said magnetoresistive elements.

7. The lapping control system of claim 6 wherein said means for measuring the resistance of said magnetoresistive elements comprises:
   a flat cable having a plurality of spaced conductors, each of said conductors having a terminal at one end, said terminals of said flat cable being spaced to contact the terminals of said magnetoresistive elements; and
   means for producing a predetermined pressure to produce electrical contact between said terminals of said flat cable and said terminals of said magnetoresistive elements.

8. The lapping control system of claim 7 wherein said means for producing a predetermined pressure comprises a spring loaded pressure bar.

* * * * *

UNITED STATES PATENT AND TRADEMARK OFFICE
CERTIFICATE OF CORRECTION

PATENT NO. : 4,914,868

DATED : April 10, 1990

INVENTOR(S) : M. A. Church et al

It is certified that error appears in the above-identified patent and that said Letters Patent is hereby corrected as shown below:

Column 1, Line 66, after "guides", insert --which is undesirable since the electrical lapping guides--.

Signed and Sealed this

Seventeenth Day of September, 1991

Attest:

HARRY F. MANBECK, JR.

Attesting Officer

Commissioner of Patents and Trademarks